United States Patent [19]
Anthoine-Milhomme et al.

[11] Patent Number: 5,847,329
[45] Date of Patent: Dec. 8, 1998

[54] SELF-SUPPORTING WEIGHT SENSOR AND SCALE INCORPORATING SENSORS OF THIS KIND

[75] Inventors: Didier Anthoine-Milhomme, Albens; Bernard Pitaud, Annecy; Michel Sarrazin, Massigny, all of France

[73] Assignee: SEB S.A., Ecully Cedex, France

[21] Appl. No.: 646,536

[22] Filed: May 8, 1996

[30]     Foreign Application Priority Data

May 9, 1995  [FR]  France .................................. 95 05478

[51] Int. Cl.⁶ ............................... G01G 3/08; G01G 3/14
[52] U.S. Cl. ..................... 177/211; 177/229; 73/862.634; 73/862.639
[58] Field of Search ..................... 177/211, 229, 177/DIG. 9; 73/514.33, 514.34, 514.38, 862.632, 862.634, 862.639

[56]               References Cited

U.S. PATENT DOCUMENTS

| 4,355,692 | 10/1982 | Ostrelich | 177/211 |
| 4,542,800 | 9/1985 | Knothe et al. | 177/211 |
| 4,548,086 | 10/1985 | Kästel | 73/862.632 |
| 4,726,436 | 2/1988 | Fukuyama et al. | 177/211 |
| 4,993,506 | 2/1991 | Angel | 177/211 |
| 5,014,799 | 5/1991 | Sato et al. | 177/211 |
| 5,183,125 | 2/1993 | Schurr | 177/211 |

FOREIGN PATENT DOCUMENTS

| 0 050 708 | 5/1982 | European Pat. Off. . |
| 0 141 710 | 5/1985 | European Pat. Off. . |
| 2 532 746 | 5/1984 | France . |

*Primary Examiner*—Randy W. Gibson
*Attorney, Agent, or Firm*—Stroock & Strook & Lavan LLP

[57]               ABSTRACT

A weight sensor includes a test body in the form of a bar carrying strain gauges, the bar bending due to the effect of the weight to be measured. The bar extends inside a frame, one end of the bar being joined to the frame, its other end being free with respect to the frame and having a bearing surface designed to be subjected to a force in the opposite direction to a reaction force applied to a bearing surface of the frame. The entire sensor is made in one piece in the form of a flat block.

17 Claims, 3 Drawing Sheets

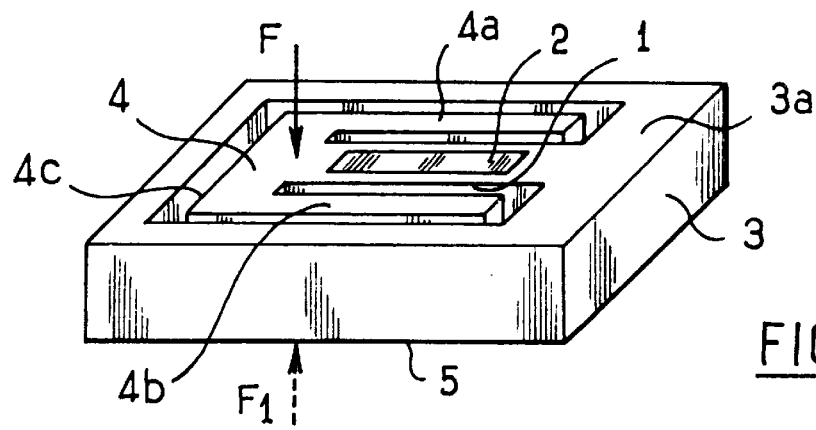
FIG_1
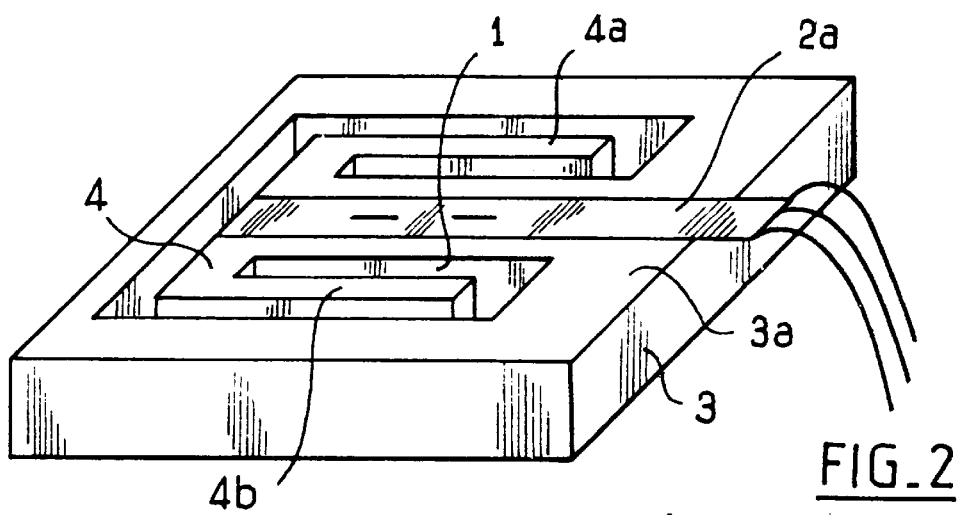
FIG_2
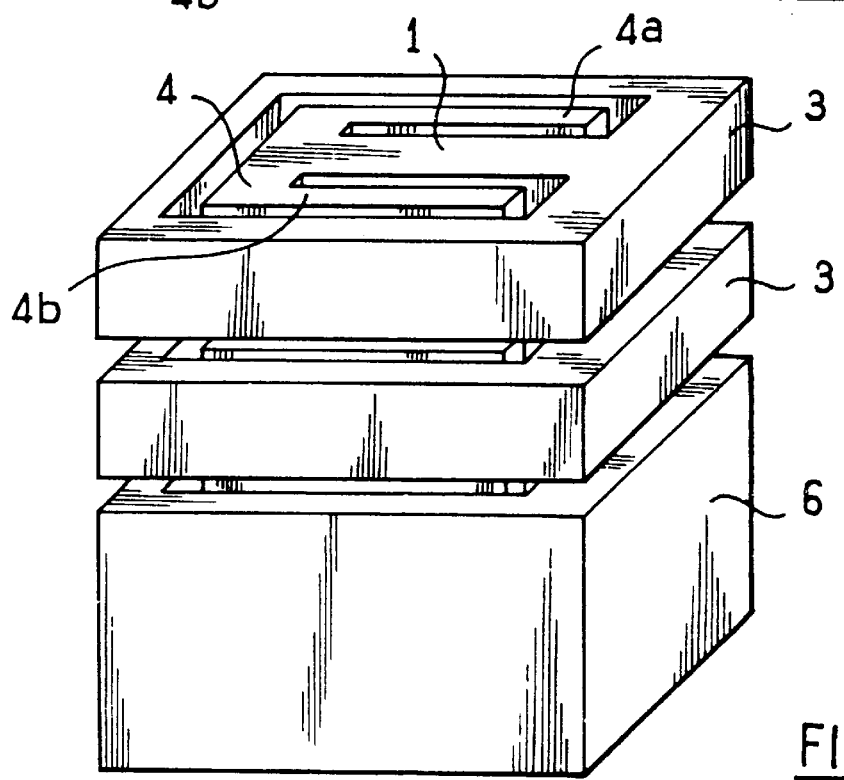
FIG_3

5,847,329

SELF-SUPPORTING WEIGHT SENSOR AND SCALE INCORPORATING SENSORS OF THIS KIND

BACKGROUND OF THE INVENTION

1. Field of the Invention

The present invention concerns a self-supporting weight sensor for use in a scale, for example.

The invention also concerns a scale incorporating one or more weight sensors.

2. Description of the Prior Art

Prior art scales include scales for weighing persons having a surface designed to receive the weight to be weighed, a base designed to rest on a flat surface and a sensor carrying strain gauges.

A scale of this kind is described in European patents 141 710 and 317 429, for example.

In this prior art scale a single sensor in the form of a metal bar is disposed between the plate and the base. The bar is essentially subjected to a bending force due to the weight to be weighed applied to the platform, but is also subject to unwanted moments and in particular torsion due to the fact that the point of application of the weight to be weighed may be offset from the sensor.

The gauges are connected to an electronic circuit to convert the deformation of the gauges into electrical signals and to convert the latter into numerical values corresponding to the measured weight.

In the case of a scale including a plurality of sensors associated with the same weighing platform, when a weight is placed on the platform the bar is subject to vertical deflection which requires horizontal stress relief to prevent return to zero defects and hysteresis errors.

This stress relief is usually provided by articulation systems using knife edges, "silentbloc" mounts or ball-joints.

In such a scale, the ends of the bars carrying the strain gauges must be totally rigidly attached to the platform and to the base, so that the load placed on the platform produces a force that is transmitted in full by the bar.

Scales of this kind are described in patents U.S. Pat. No. 3,512,595, FR 2 356 913 and GB 1 373 992, for example.

Patent EP 0 519 818 describes a unitary construction scale in which the platform, the bar and the base are made in one piece.

American patent 4,993,506 describes a weight sensor for use in a scale and made as a single piece in the form of a flat block, comprising a test body in the form of a bar carrying strain gauges, said bar being subjected to bending due to the effect of the weight to be measured. The opposite ends of the bar are each connected to a U-shape bearing surface designed to be subjected to a force in the opposite direction to a force applied to the other bearing surface.

The above patent also describes a scale comprising a platform resting on four sensors of the above type. One of the two U-shape bearing surfaces of the sensor is screwed to the platform.

Given that the two U-shape surfaces are on opposite sides of the mid-point of the bar, the screw fixings of the sensor are heavily loaded when a load is applied to the scale.

Accordingly, these fixings must be rigid, which represents a fabrication constraint.

What is more, because of these rigid fixings the sensors are no longer independent of each other, being coupled to each other by the platform. This leads to problems due to hysteresis and to return to zero defects.

An object of the present invention is to remedy the above drawbacks by providing a self-supporting sensor that is simple to fabricate, facilitates the fabrication of a scale and improves the quality of the latter.

SUMMARY OF THE INVENTION

The invention consists in a weight sensor suitable for use in scale and in the form of a flat block comprising a test body in the form of a bar carrying strain gauges, said bar bending due to the weight to be measured, the opposite ends of said bar being each joined to a bearing surface designed to be subjected to a force in the opposite direction to a reaction force applied to the other bearing surface, one bearing surface being carried by a frame inside which said bar extends, and one end of said bar being joined to said frame, its other end carrying the other bearing surface, the latter being free relative to the frame and lying entirely inside the latter.

Thus the sensor of the invention is in the form of a flat block integrating both the test body (i.e. the bar) and the two opposite bearing surfaces, one of which is designed to be subjected to the weight to be measured and the other to the reaction force thereto.

It is consequently self-supporting, i.e. its bearing surfaces enable it to be in mechanical equilibrium of its own accord at all times.

Because it is in the form of a flat block, a sensor of this kind is easy to integrate into measuring equipment, such as a scale, and consequently solves the problems due to the rigid attachment of the bar to the base and to the platform of a scale.

Because one of the bearing surfaces is totally circumscribed by the other bearing surface carried by the bar, the sensor remains in equilibrium when the two bearing surfaces are loaded. Because of this the platform of a scale can be joined to one of the bearing surfaces of the sensor by non-rigid, relatively loose or flexible mechanical couplings, since they are not loaded by the weight to be measured.

In an advantageous embodiment of the invention the frame is rectangular in shape.

The bar preferably extends along a direction of symmetry of the frame.

In one particular embodiment of the invention the bearing surface carried by said end of the bar has two sections extending inside the frame symmetrically relative to the bar.

In a preferred embodiment of the invention the strain gauges are disposed on a ceramic support glued to the bar and on a part of said frame adjacent one end of the bar and a part of said bearing surface adjacent said other end of the bar.

This arrangement improves the operation of the sensor.

The invention also consists in a scale incorporating at least one weight sensor in accordance with the invention.

The scale preferably incorporates at least three weighing sensors in accordance with the invention disposed under a common platform, the strain gauges carried by the bars being connected to a common electronic measuring circuit.

A scale of this kind remedies the drawbacks of the prior art scale having only one sensor and in which the single bar is subjected to unwanted moments and considerable bending.

In a preferred embodiment of the scale the platform is in contact with one face of the sensors through members that bear on the bearing surface carried by said other end of the bar, leaving the frame free.

In another embodiment the platform is in contact with one phase of the sensors through members that bear on the bearing surface constituted by the frame, leaving free the bearing surface carried by said other end of the bar.

In both the above embodiments the sensors are part of the feet of the scale. The base of the scale is then of no utility. The sensors of the invention in the form of flat blocks thus provide a scale that is simple to construct and yields accurate measurements since errors due to unwanted moments are minimized.

Other features and advantages of the invention will emerge further from the following description and the accompanying drawings, provided by way of non-limiting example.

BRIEF DESCRIPTION OF THE DRAWINGS

FIG. 1 is a perspective view of a weight sensor of the invention.

FIG. 2 is a view analogous to FIG. 1 showing an alternative embodiment of the invention.

FIG. 3 is a perspective view showing the slicing of sensors in accordance with the invention from a metal bar.

DETAILED DESCRIPTION OF THE INVENTION

Figure 5:
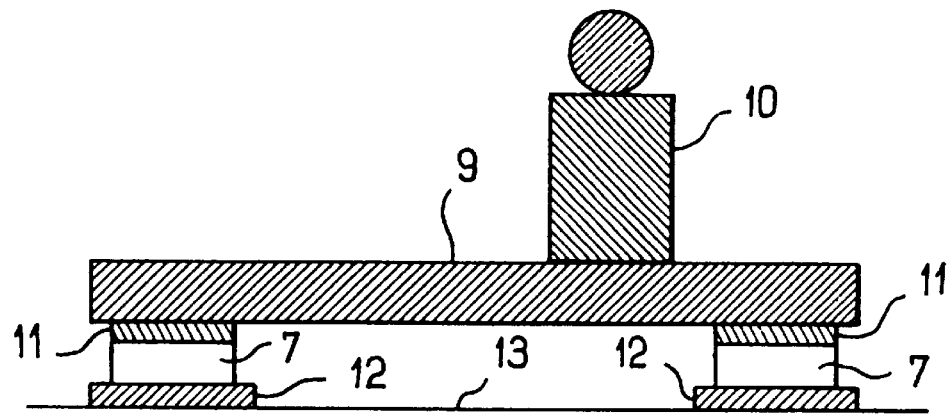
FIG. 5 is a longitudinal section of a scale of the invention.

In the embodiment of FIGS. 1 and 2 the weight sensor suitable for a scale comprises a test body in the form of a bar 1 carrying strain gauges 2, 2a, said bar 1 bending due to the effect of the weight to be measured.

In accordance with the invention, said bar 1 extends inside the frame 3. One end of the bar 1 is joined to the frame 3 and its other end is free relative to the frame 3 and includes a bearing surface 4 adapted to be subjected to a force F in the opposite direction to a force F1 applied to a bearing surface 5 of the frame 3. The entire sensor is made in one piece from an elastic material in the form of a flat block. The bearing surface 4 lies entirely within the frame 3.

In the examples shown the frame 3 is rectangular in shape. The frame 3 could be other shapes, however (circle, trapezium, hexagon, etc). The frame 3 need not be a closed frame.

The bar 1 extends along a direction of symmetry of the frame 3. The bearing surface 4 carried by said other end of the bar 1 has two sections 4a, 4b extending inside the frame 3 and preferably symmetrical to the bar 1.

As shown in FIGS. 1 and 2, the bearing surface 4 carried by said other end of the bar 1 has a section 4c preferably perpendicular to the bar 1 and to the section 3a of the frame 3 to which the bar is joined. The section 4c perpendicular to the bar 1 is extended by the two parallel sections 4a, 4b extending towards the section 3a of the frame 3. The length of the two sections 4a, 4b is slightly less than that of the bar 1.

In the FIG. 2 example the strain gauges 2a are disposed on a ceramic support glued to the bar 1 over its entire length and to a part of the frame 3 adjacent one end of the bar 1 and to a part of the bearing surface 4 adjacent the other end of the bar 1.

Experience has shown that this arrangement improves the operation of the sensor, especially if the sensor has small dimensions.

The sensor shown in FIGS. 1 and 2 is a flat elastic metal block of constant thickness that can be made simply and economically by cutting slices from a metal bar having appropriate mechanical characteristics (see FIG. 3). The sensor can equally be made by sintering metal powder or by cutting it out from metal plate.

The unitary construction sensor comprising both the test body and two opposite bearing surfaces can be incorporated into a scale in a particularly simple manner.

The scale preferably comprises at least three weight sensors of the invention. The scale shown in FIG. 4 comprises four sensors 7. The strain gauges carried by the bars of these sensors 7 are connected to a common electronic measuring circuit 8.

Figure 4:
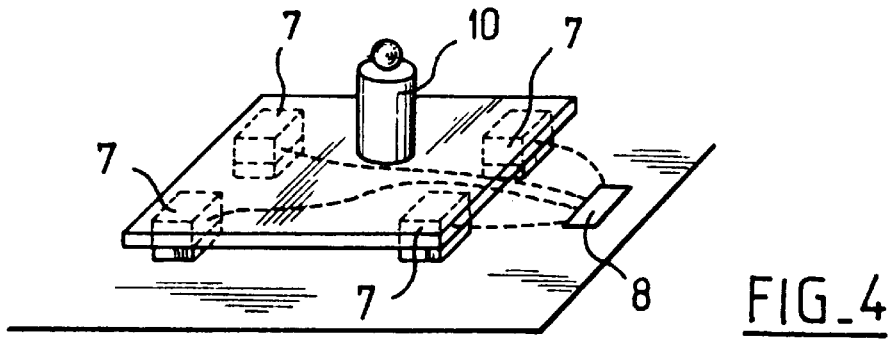
FIG. 4 is a perspective view of a scale of the invention.

The scale shown in FIGS. 4 and 5 includes a platform 9 adapted to receive the weight 10 to be measured.

Figure 6:
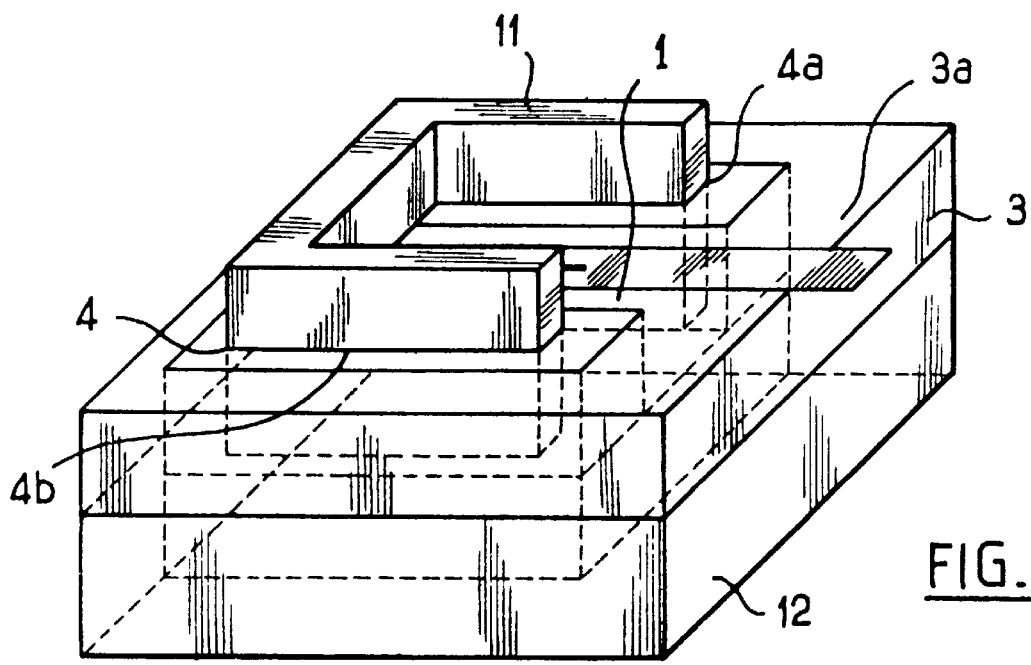
FIG. 6 is a perspective view of a sensor provided on two opposite faces with bearing members adapted to come into contact with the platform of the scale and with a flat surface, respectively.

As shown in FIG. 5, the platform 9 is in contact with one face of the sensors 7 through substantially U-shape members 11 that bear on the bearing surface 4 carried by the other end of said bar 1, leaving the frame 3 free (see FIG. 6).

As an alternative to this, the platform 9 could be in contact with one face of the sensors 7 through members that bear on the bearing surface 5 constituted by the frame, leaving free the bearing surface 4 carried by said other end of the bar 1. In this case, the arrangement of the sensors 7 is reversed relative to that described above.

Figure 7:
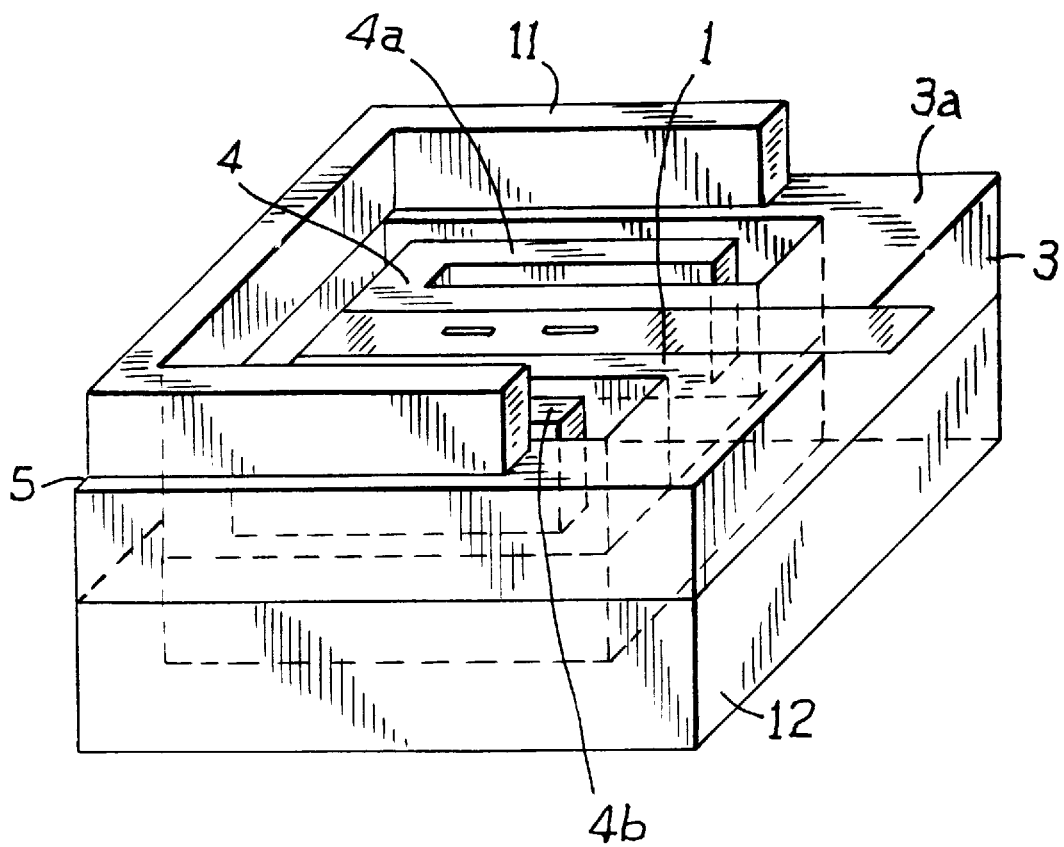
FIG. 7 is a perspective view of a sensor in accordance with another embodiment of the invention.

As is shown in FIG. 7, the bearing surface 5 of the sensors 7 opposite that in contact with the members 11 attached to the platform 9 is in contact with a member 12 designed to rest on the surface 13 such as a table on which the scale is placed.

The member 12 forms with the corresponding sensor 7 one of the four feet of the scale. Consequently, the scale does not require any base.

Of course, like the members 11, the members 12 are in contact with one of the bearing surfaces 4 or 5 of the sensor 7, leaving the other bearing surface free, so that the bar 1 can bend freely.

To this end it is sufficient if the members 11 and 12 are hollowed out in an appropriate manner.

The members 12 are preferably elastomer blocks.

During weighing, the mechanical couplings between the platform and the sensors are not loaded since, because of their construction, the sensors are in mechanical equilibrium. These mechanical couplings can therefore be relatively loose or flexible, for example clipped or snap-fastened. Non-rigid couplings of this kind have the advantage of making the sensors independent of one another, the effect of which is to eliminate the drawbacks associated with hysteresis and return to zero defects.

The invention therefore provides a scale such as a scale for weighing persons at low cost and remedying all the drawbacks of prior art scales.

The sensors of scales for weighing persons may be made of steel, for example. The length of the bar 1 can be 15 mm and its cross-section equal to 10 mm×15 mm. The overall size of the sensor can be 38 mm×38 mm and its total thickness equal to 5 mm.

There is claimed:

1. A weight sensor, comprising:

a frame having a frame bearing surface;

a bar having a constrained end attached to said frame at a frame section and a free end having an end bearing surface, said bar including said end bearing surface and being disposed within and entirely circumscribed by said frame;

a strain gauge attached to said bar;

said frame and bar positioned and arranged such that, when a weight is applied to the sensor, either of said end bearing surface and said frame bearing surface is subjected to a force and the other of said end bearing surface and said frame bearing surface is subjected to a reaction force.

2. Weight sensor suitable for use in a scale and in the form of a flat block comprising a test body in the form of a bar carrying strain gauges, said bar bending due to the weight to be measured, the opposite ends of said bar being each joined to a bearing surface designed to be subjected to a force in the opposite direction to a reaction force applied to the other bearing surface, one bearing surface being carried by a frame inside which said bar extends, and one end of said bar being joined to said frame, its other end carrying the other bearing surface, the latter being free relative to said frame and being completely circumscribed by the latter, said frame being rectangular in shape.

3. The weight sensor according to claim 1 wherein said frame is shaped to be symmetrical with said bar.

4. The weight sensor according to claim 1 wherein said end bearing surface has two sections disposed within said frame, each section shaped to have at least one side parallel to said bar.

5. The weight sensor according to claim 2 wherein said end bearing surface includes an arm, having two ends, positioned perpendicular to said bar and to said frame section, said arm having two parallel sections extending from said ends of said arm toward said frame section.

6. The weight sensor according to claim 4 wherein the length of said two sections is slightly less than that of said bar.

7. The weight sensor according to claim 1 wherein said strain gauges is disposed on a ceramic support glued to said bar and to part of said frame section and to a part of said end bearing surface.

8. The weight sensor according to claim 1 comprising a flat metal block of constant thickness.

9. The weight sensor according to claim 8 made by slicing a metal bar.

10. A scale comprising at least one weight sensor as claimed in claim 1.

11. A scale, comprising at least three weight sensors as claimed in claim 1, said strain gauges attached to said bars of said sensors being connected to a common electronic circuit.

12. The scale according to claim 11 comprising a platform designed to receive a weight to be measured, wherein said platform is in contact with one face of said sensors through members that bear on said end bearing surface.

13. The scale according to claim 11 comprising a platform designed to receive a weight to be measured, wherein said platform is in contact with one face of said sensors through members that bear on said frame bearing surface.

14. The scale according to claim 12 wherein said frame bearing surface of said sensors is in contact with a base member designed to bear on a surface on which said scale is placed, each of said members forming with a corresponding sensor one of the feet of said scale.

15. The scale according to claim 13, wherein said end bearing surface of said sensors is in contact with a base member designed to bear on a surface on which said scale is place.

16. The scale according to claim 14 wherein said base member is an elastomer block.

17. The scale according to claim 14 wherein said members in contact with each of said frame bearing surfaces of said sensors are flexibly fixed to said platform and to said sensors.

* * * * *